United States Patent [19]

Summers

[11] 3,853,964
[45] Dec. 10, 1974

[54] GUANIDINE SALTS OF CHLORINATED AND/OR BROMINATED AMINABENZENE SULFONIC ACIDS

[75] Inventor: John Clifford Summers, Wilmington, Del.

[73] Assignee: E. I. du Pont de Nemours and Company, Wilmington, Del.

[22] Filed: Nov. 9, 1972

[21] Appl. No.: 305,083

Related U.S. Application Data

[62] Division of Ser. No. 54,017, July 10, 1970, Pat. No. 3,718,658.

[52] U.S. Cl. ........................................... 260/501.12
[51] Int. Cl. ........................................... C07c 143/63
[58] Field of Search ............................... 260/501.12

[56] References Cited
UNITED STATES PATENTS

| | | | |
|---|---|---|---|
| 3,718,658 | 2/1973 | Summers | 260/501.12 |
| 3,751,454 | 8/1973 | Minami et al. | 260/501.14 |

OTHER PUBLICATIONS

Karrer et al., Helvetica Chimica Acta., Vol. 24, pp. 310–311, (1941).

*Primary Examiner*—Leon Zitver
*Assistant Examiner*—Michael W. Glynn

[57] ABSTRACT

Aminobenzene sulfonate salts of guanidine, useful as flame-retardants for synthetic polymeric resins. Incorporation of such salts into, for example, polycarbonamides, produces a self-extinguishing flame-resistant composition.

2 Claims, No Drawings

GUANIDINE SALTS OF CHLORINATED AND/OR BROMINATED AMINABENZENE SULFONIC ACIDS

CROSS REFERENCE TO RELATED APPLICATIONS

This application is a division of application Ser. No. 54,017, filed July 10, 1970 and assigned to the assignee of the present invention, now U.S. Pat. No. 3,718,658, issued Feb. 27, 1973.

BACKGROUND OF INVENTION

This invention relates to aminobenzene sulfonate compounds of guanidine and flame-resistant polycarbonamide compositions containing such compounds.

The literature discloses that phosphates of guanyl urea (U.S. Pat. No. 2,488,034) and guanidine (U.S. Pat. No. 2,520,103) are useful as flameproofing agents for cellulosic materials. Carbonates and sulfates of guanidine and guanylurea (U.S. Pat. No. 2,482,755) are also known in the art as combustion inhibitors for both cellulosic and proteinaceous materials. This latter reference also indicates that the disclosed compounds are effective inhibitors for synthetic materials such as rayon (regenerated cellulose). The primary problem involved in the flameproofing of cellulosic and proteinaceous materials appears, from the literature, to be the prevention of degradation of the fibers and materials by the disclosed agents and processes.

Compatibility of flameproofing agents with polymer, not degradation, appears as the primary problem confronting combustion inhibitor technology with respect to synthetics. Ordinarily, it has required appreciable amounts of flameproofing agents to impart the desired degree of flame resistance. Because the most efficient and effective method of imparting such protection requires incorporation of inhibitor into the raw polymer, the natural characteristics (clarity, resilience and strength) are somewhat, if not dramatically, altered. There is a pressing need in this area of technology for compounds and techniques that would provide the requisite degree of inhibition while causing the least interference with the natural polymeric properties.

My invention provides these compounds and techniques. The compounds of this invention will impart substantial flame resistance to polycarbonamides at relatively low concentrations, thereby reducing, if not eliminating in most instances, appreciable alteration of natural polymeric properties.

SUMMARY OF INVENTION

In summary, the flame-retarding compounds of this invention are of the general formula

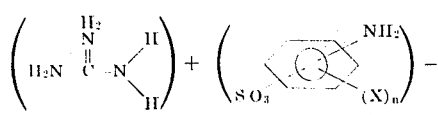

wherein
n is a positive integer from 1 to 4, and
x independently represents Cl or Br.

This invention also encompasses polycarbonamide compositions containing an effective amount of the above compounds.

DESCRIPTION OF INVENTION

Compounds

The guanidine aminobenzene sulfonate salts of this invention can be represented by the formula

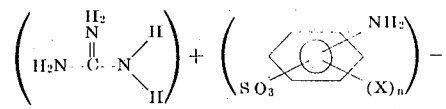

wherein
n is a positive integer from 1 to 4, and
x independently represents Cl or Br.

The guanidine and guanidinium compounds of this invention can be prepared by merely titrating a basic aqueous guanidine solution with the appropriate sulfanilic acid to neutrality. As the solvent medium is evaporated, the desired reaction product will form crystals and precipitate. This product can be dissolved and recrystallized in water to enhance its purity.

Representative of the compounds of this invention which demonstrate significant combustion inhibition when applied to, or combined with, synthetic polymeric materials are guanidinium 2-bromo-6-chlorosulfanilate, guanidinium 2-chlorosulfanilate, guanidinium 2-bromosulfanilate, and guanidinium tetrachlorosulfanilate.

The compound guanidinium sulfanilate is old in the art and its preparation has been described as early as 1941 (see Helv. Chim. Acta. 24: 310-311). It possesses the same general flame-retardant properties as the novel compounds of this invention; however, these properties, up to now, have remained unappreciated.

Polymer

The synthetic polymeric materials which can be rendered flame-resistant by the addition of an effective amount of the compounds of this invention are generally known as polycarbonamide; i.e. long-chain synthetic polyamides having recurring amide groups

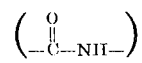

as an integral part of the polymer chain. The preferred polycarbonamides of the flame-resistant compositions of this invention are those which have recurring units of the formula

wherein R and R' are independently selected divalent hydrocarbon radicals containing about four to 14 carbon atoms, selected from the group consisting of saturated aliphatic and cycloaliphatic radicals, and aromatic radicals, including mixed aliphatic/cycloaliphatic and aliphatic/aromatic radicals. Examples of such polycarbonamides include polycaprolactam (nylon 6) and polyhexamethyleneadipamide (nylon 6,6).

Compositions

The compounds of this invention, and guanidinium sulfanilate, can be readily combined with polycarbonamides, and hot-pressed or melt-blended into flame-resistant films or fibers.

The amount of flame-retardant necessary to impart flame-resistance to a polycarbonamide composition of this invention will ordinarily range from 0.05 to 5.0 percent by weight of the polymer depending on the particular compound. Concentrations of retardant in such compositions can exceed 5 percent however, as a practical matter, concentrations of flame-retardant compound in excess of this arbitrary level tend to cause interference in the inherent properties of the polymer.

The polycarbonamide compositions of this invention can contain, in addition to the polymer and a flame-retardant compound, other conventional additives, such as delusterants, anti-oxidants, anti-static agents, dye acceptors, and the like.

As effective amount of flame-retardant compound can be dry-mixed with a polycarbonamide, and the resulting mixture hot-pressed or melt blended. After the mixture has become molten, it can be shaped or spun into flame-resistant articles or fibers. Alternatively, an effective amount of flame-retardant compound can also be stirred into already molten polycarbonamide and substantially the same results achieved. Apparently, the method of combining or blending the flame-retardant and polycarbonamide is not critical so long as there is a uniform dispersion of these sulfanilate compounds throughout the polymer.

The following examples are included to further specifically illustrate the preparation of the compounds and compositions of this invention. Parts and percentages used are by weight unless otherwise stipulated.

EXAMPLE 1

To 316 parts barium hydroxide octahydrate dissolved in 1600 parts water are added 216 parts guanidine sulfate dissolved in 250 parts water. The resulting barium sulfate precipitate is removed by filtration to give a clear guanidine solution. About 310 parts sulfanilic acid are added until pH is about 7. Removal of water and subsequent recrystallization from water gives 289 parts guanidinium sulfanilate, m.p. 219°–221°C. and a second crop of 61 parts, m.p. 215°–218°C.

| Anal. | |
|---|---|
| Calcd. for $C_7H_{12}N_4O_3S$: | C, 36.20; H, 5.20; N, 24.12 |
| Found: | C, 36.08; H, 5.20; N, 24.62 |

To nine parts of powdered 66 nylon is added one part of guanidinium sulfanilate, and the resulting mixture is made homogeneous by tumbling. A sample is pressed between aluminum sheets at 275°C. on a hot press for one minute. The resulting nylon film is cooled and removed from the aluminum sheets to give a transparent, flexible, relatively bubble-free film which is self-extinguishing in a vertical match test using a wooden match burning for 15 sec. in a draft-free environment. An untreated nylon film is consumed in this test.

EXAMPLE 2

An aqueous guanidine solution is prepared in the same manner as in Example 1. To an equivalent solution containing 5.9 parts guanidine is added 28.9 parts 2-bromo-6-chlorosulfanilic acid until the pH is about 7. Concentration of solution gives guanidinium 2-bromo-6-chlorosulfanilate.

To 9 parts of powdered nylon is added one part of guanidinium 2-bromo-6-chlorosulfanilate, and the resulting mixture is made homogeneous by tumbling. A sample is pressed between aluminum sheets at 275°C. on a hot press for one minute. The resulting nylon film is cooled and removed from the aluminum to give a film which is flame retarding in a vertical match test using a wooden match burning for 15 sec. in a draft-free environment. An untreated nylon film is consumed in this test.

EXAMPLE 3

An aqueous guanidine solution is prepared as in Example 1. To an equivalent solution containing 5.9 parts guanidine is added 20.7 parts 2-chlorosulfanilic acid until the pH is about 7. Concentration of solution yields guanidinium 2-chlorosulfanilate.

To 9 parts of powdered nylon is added one part of guanidinium 2-chlorosulfanilate, and the resulting mixture is made homogeneous by tumbling. A sample is pressed between aluminum sheets at 275°C. on a hot press for one minute. The resulting nylon film is cooled and removed from the aluminum sheets to give a film which is flame retarding in a vertical match test using a wooden match burning for 15 sec. in a draft-free environment. An untreated nylon film is consumed in this test.

EXAMPLE 4

An aqueous guanidine solution is prepared as in Example 1. To an equivalent solution containing 5.9 parts guanidine is added 25.2 parts 2-bromosulfanilic acid until the pH is about 7. Concentration of the solution gives guanidinium 2-bromosulfanilate.

To 9 parts of powdered nylon is added one part of guanidinium 2-bromosulfanilate, and the resulting mixture is made homogeneous by tumbling. A sample is pressed between aluminum sheets at 275°C. on a hot press for one minute. The resulting nylon film is cooled and removed from the aluminum sheets to give a film which is flame retarding in a vertical match test using a wooden match burning for 15 sec. in a draft-free environment. An untreated nylon film is consumed in this test.

EXAMPLE 5

An aqueous guanidine solution is prepared as in Example 1. To an equivalent solution containing 5.9 parts guanidine is added 31.1 parts tetrachlorosulfanilic acid until the pH is about 7. Concentration of the solution yields guanidinium tetrachlorosulfanilate.

To 9 parts of powdered nylon is added one part of guanidinium tetrachlorosulfanilate, and the resulting mixture is made homogeneous by tumbling. A sample is pressed between aluminum sheets at 275°C. on a hot press for one minute. The resulting nylon film is cooled and removed from the aluminum sheets to give a film which is self-extinguishing in a vertical match test using a wooden match burning for 15 sec. in a draft-free environment. An untreated nylon film is consumed in this test.

EXAMPLE 6

Guanidinium sulfanilate is prepared as in Example 1.

To nine parts of powdered 66 nylon is added one part of guanidinium sulfanilate, and the resulting mixture is melt-blended to a homogeneous melt at 275°C. From the melt is spun nylon fiber which is flame retarding in a vertical match test using a wooden match burning for 15 sec. in a draft-free environment.

What is claimed is:

1. Compounds having the general formula:

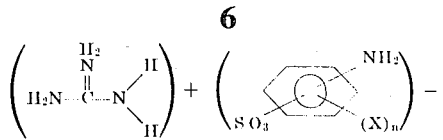

wherein
$n$ is a positive integer from 1 to 4, and
X independently represents Cl or Br.

2. The compound having the formula of claim 1, guanidinium 2-bromo-6-chlorosulfanilate.

* * * * *